US011084489B2

(12) United States Patent
Ogino et al.

(10) Patent No.: US 11,084,489 B2
(45) Date of Patent: Aug. 10, 2021

(54) AUTOMATED DRIVING ASSIST SYSTEM

(71) Applicant: SUBARU CORPORATION, Tokyo (JP)

(72) Inventors: Shuu Ogino, Tokyo (JP); Sogo Kanai, Tokyo (JP); Kazuya Kozono, Tokyo (JP); Noriaki Taguchi, Tokyo (JP); Shimpei Fujimori, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 242 days.

(21) Appl. No.: 16/402,009

(22) Filed: May 2, 2019

(65) Prior Publication Data

US 2019/0389465 A1 Dec. 26, 2019

(30) Foreign Application Priority Data

Jun. 21, 2018 (JP) .............................. JP2018-117735

(51) Int. Cl.
*B60W 30/18* (2012.01)
*B60R 1/00* (2006.01)
(Continued)

(52) U.S. Cl.
CPC ....... *B60W 30/18009* (2013.01); *B60R 1/005* (2013.01); *B60R 21/013* (2013.01);
(Continued)

(58) Field of Classification Search
CPC .......... B60W 60/001; B60W 60/0016; B60W 60/0017; B60W 2520/04; B60W 2756/10;
(Continued)

(56) References Cited

U.S. PATENT DOCUMENTS

2016/0318490 A1* 11/2016 Ben Shalom ............. B60T 7/18
2018/0162390 A1* 6/2018 Miura .................. G05D 1/0088

FOREIGN PATENT DOCUMENTS

JP 2005-165643 A 6/2005
JP 2008-308025 A 12/2008
(Continued)

OTHER PUBLICATIONS

Japanese Notice of Reasons for Refusal issued in corresponding Japanese Patent Application No. 2018-117735, dated Jun. 23, 2020, with English translation.

*Primary Examiner* — Marthe Y Marc-Coleman
(74) *Attorney, Agent, or Firm* — McDermott Will & Emery LLP

(57) ABSTRACT

An automated driving assist system includes a vehicle controller that includes an entry-permission determiner. The entry-permission determiner searches for first and second traffic lights successively installed on a target traveling course. When the first and second traffic lights are successively installed, the entry-permission determiner determines whether the first traffic light is installed at an intersection. When the first and second traffic lights are successively installed and the first traffic light is installed at the intersection, the entry-permission determiner detects respective lighting statuses of signals indicated by the first and second traffic lights. When the first traffic light indicates a signal permitting vehicles to advance and the second traffic light indicates a signal prohibiting the vehicles from advancing, the entry-permission determiner acquires an available stop distance. The entry-permission determiner permits the own vehicle to enter the intersection based on the available stop distance and a traveling condition of a preceding vehicle.

5 Claims, 9 Drawing Sheets

(51) Int. Cl.
  *B60R 21/013* (2006.01)
  *B60W 10/04* (2006.01)
  *B60W 40/04* (2006.01)
  *G08G 1/16* (2006.01)
  *B60W 30/09* (2012.01)
  *B60W 10/18* (2012.01)
  *B60R 21/01* (2006.01)
  *B60T 7/12* (2006.01)

(52) U.S. Cl.
  CPC ............ *B60W 10/04* (2013.01); *B60W 30/09* (2013.01); *B60W 40/04* (2013.01); *G08G 1/166* (2013.01); *B60R 2021/01013* (2013.01); *B60T 7/12* (2013.01); *B60W 10/18* (2013.01)

(58) Field of Classification Search
  CPC ........... B60W 39/18009; B60W 30/09; B60W 10/18; B60W 30/143; B60W 2520/10; B60W 2554/404; B60W 2555/60; B60R 1/005; B60R 21/013; B60R 2021/01013; G08G 1/166; G08G 1/0112; B60T 7/12
  See application file for complete search history.

(56) References Cited

FOREIGN PATENT DOCUMENTS

| | | |
|---|---|---|
| JP | 2012-160127 A | 8/2012 |
| JP | 2016-103199 A | 6/2016 |

\* cited by examiner

AUTOMATED DRIVING ASSIST SYSTEM

CROSS-REFERENCE TO RELATED APPLICATIONS

The present application claims priority from Japanese Patent Application No. 2018-117735 filed on Jun. 21, 2018, the entire contents of which are hereby incorporated by reference.

BACKGROUND

The technology relates to an automated driving assist system for a vehicle.

Once a destination is input by an operator, a typical automated driving assist system determines a traveling route from a current position to the destination, and executes automated driving of an own vehicle along all or part of the traveling route on behalf of a driver. While the own vehicle is automatically traveling on an ordinary road, the automated driving assist system recognizes, with a sensing device such as a camera, a traveling environment in front of the own vehicle to constantly monitor the presence of a preceding vehicle, a color of a signal and a direction of an arrow signal indicated by a traffic light, for example.

The automated driving assist system is configured to execute an adaptive cruise control (ACC) that causes the own vehicle to travel following a preceding vehicle. When detecting a preceding vehicle traveling ahead of the own vehicle on a target traveling course which is determined along the traveling route, the automated driving assist system activates the ACC to control the speed of the own vehicle to a predetermined speed on the basis of an intervehicle distance between the own vehicle and the preceding vehicle and a relative vehicle speed between the own vehicle and the preceding vehicle, for example. In addition, on the basis of the information on the environment in front of the own vehicle obtained by the sensing device, such as a vehicle-mounted camera, the ACC recognizes a color of a signal indicated by a traffic light installed at an intersection. In a case where the traffic light indicates a signal in green (i.e., green signal) or in a case where the traffic light indicates a signal in red (i.e., red signal) and an arrow signal pointing in a direction identical to a traveling direction of the own vehicle, the ACC permits the own vehicle to enter the intersection and also causes the own vehicle to travel along the target traveling course. For example, the own vehicle is caused to travel straight or turn right or left along the target traveling course.

A driving assist system disclosed in Japanese Unexamined Patent Application Publication (JP-A) No. 2008-308025, for example, predicts an abrupt stop of the preceding vehicle in a situation where the own vehicle tries to enter the intersection following the preceding vehicle and where the traffic light is predicted to indicate a yellow signal or a red signal that prohibits the entry of the own vehicle into the intersection. Additionally, if the preceding vehicle passes through the intersection in such a situation, the driving assist system decelerates the own vehicle without causing the own vehicle to follow the preceding vehicle.

SUMMARY

An aspect of the technology provides an automated driving assist system including: a first acquirer configured to acquire traveling environment information indicating a traveling environment in front of an own vehicle; an estimator configured to estimate a current position of the own vehicle; a setter configured to set a target traveling course on a basis of the current position of the own vehicle estimated by the estimator and a destination determined, the target traveling course being retrieved from road map information; and a vehicle controller configured to cause the own vehicle to travel along the target traveling course. The vehicle controller includes an entry-permission determiner configured to determine whether to permit an entry of the own vehicle into an intersection positioned on the target traveling course in front of the own vehicle. The entry-permission determiner includes: a finding section configured to search, on a basis of either one of the road map information and the traveling environment information acquired by the first acquirer, for presence of a first traffic light and a second traffic light that are successively installed on the target traveling course in front of the own vehicle, and to find, in a case where determining that the first traffic light and the second traffic light that are successively installed are present, whether the first traffic light is installed at the intersection in front of the own vehicle, the first traffic light being closer to the own vehicle than the second traffic light is, the second traffic light being farther from the own vehicle than the first traffic light is; a first detector configured to detect, in a case where the finding section determines that the first traffic light and the second traffic light that are successively installed are present and that the first traffic light is installed at the intersection in front of the own vehicle, respective lighting statuses of a signal indicated by the first traffic light and a signal indicated by the second traffic light, the respective lighting statuses of the signal indicated by the first traffic light and the signal indicated by the second traffic light being detected on a basis of the traveling environment information acquired by the first acquirer; a second acquirer configured to acquire, in a case where the first detector detects that the first traffic light indicates a signal permitting vehicles to advance and that the second traffic light indicates a signal prohibiting the vehicles from advancing, an available stop distance available for stopping the own vehicle therein, the available stop distance being determined on a basis of either one of the road map information and the traveling environment information acquired by the first acquirer, the available stop distance extending from a farther stop line positioned on a road surface on which the second traffic light is installed to the intersection in front of the own vehicle; and a determiner configured to determine, on a basis of the available stop distance acquired by the second acquirer and a traveling condition of a preceding vehicle traveling ahead of the own vehicle, whether to permit the entry of the own vehicle into the intersection in front of the own vehicle.

An aspect of the technology provides an automated driving assist system including: an acquirer configured to acquire traveling environment information indicating a traveling environment in front of an own vehicle; a detector configured to detect, in a case where a first traffic light and a second traffic light that are successively installed are present and where the first traffic light is installed at an intersection in front of the own vehicle, respective lighting statuses of a signal indicated by the first traffic light and a signal indicated by the second traffic light, the respective lighting statuses of the signal indicated by the first traffic light and the signal indicated by the second traffic light being detected on a basis of the traveling environment information acquired by the acquirer, the first traffic light being closer to the own vehicle than the second traffic light is, the second traffic light being farther from the own vehicle than the first traffic light is; and circuitry configured to: estimate a current position of the own vehicle; set a target traveling course on a basis of the estimated current position of the own vehicle and a destination determined, the target traveling course being retrieved from road map information; cause the own vehicle to travel along the target traveling course; determine whether to permit an entry of the own vehicle into the intersection in front of the own vehicle on the target traveling course; search, on a basis of either one of the road map information and the traveling environment information acquired by the acquirer, for presence of the first traffic light and the second traffic light that are successively installed on the target traveling course in front of the own vehicle, and find, in a case where it is determined that the first traffic light and the second traffic light that are successively installed are present, whether the first traffic light is installed at the intersection in front of the own vehicle; acquire, in a case where the detector detects that the first traffic light indicates a signal permitting vehicles to advance and that the second traffic light indicates a signal prohibiting the vehicles from advancing, an available stop distance available for stopping the own vehicle therein, the available stop distance being determined on a basis of either one of the road map information and the traveling environment information acquired by the acquirer, the available stop distance extending from a farther stop line positioned on a road surface on which the second traffic light is installed to the intersection in front of the own vehicle; and determine, on a basis of the acquired available stop distance and a traveling condition of a preceding vehicle traveling ahead of the own vehicle, whether to permit the entry of the own vehicle into the intersection in front of the own vehicle.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
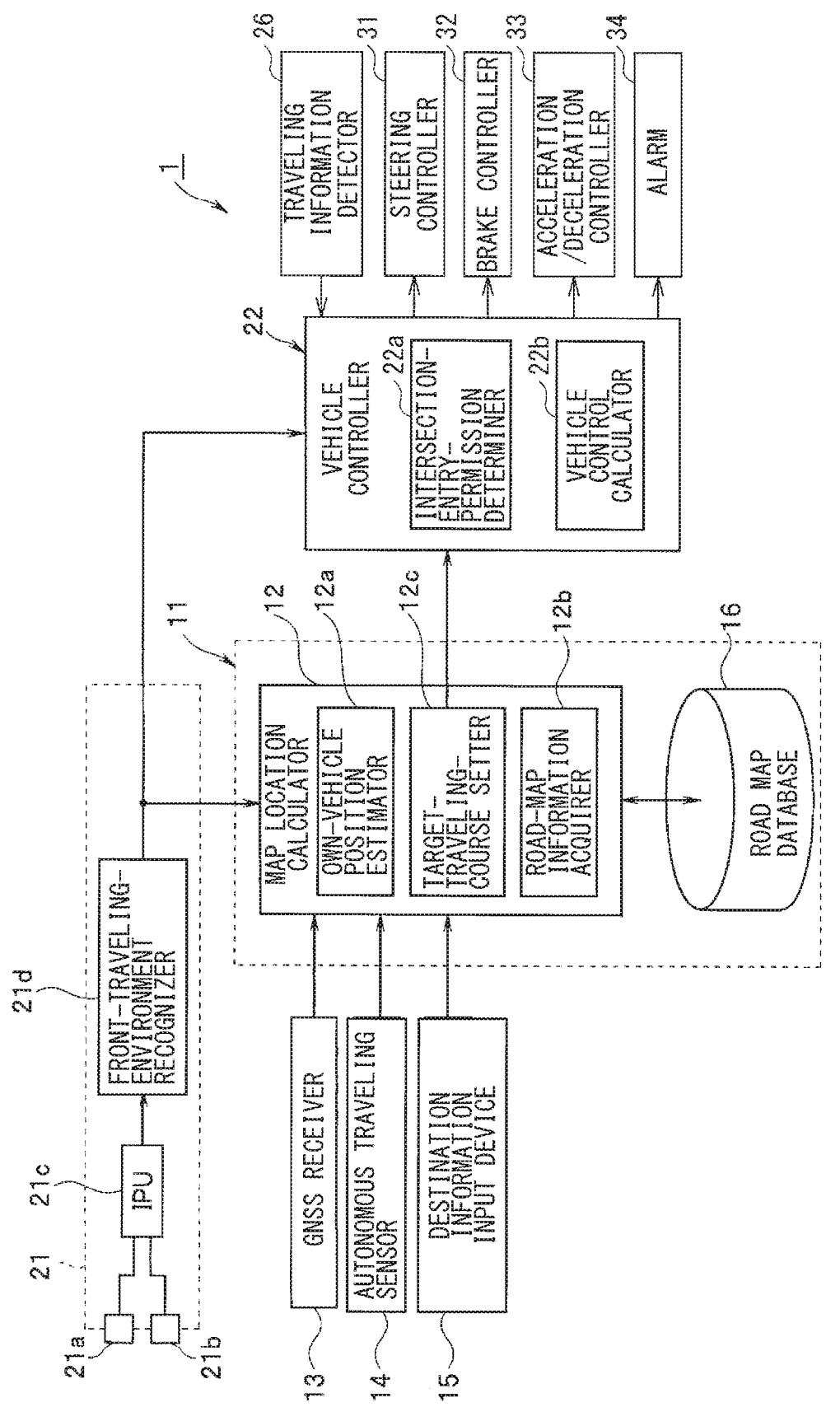
FIG. 1 is a diagram schematically illustrating an example configuration of an automated driving assist system according to one example embodiment of the technology.

In the following, some embodiments of the technology are described with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

In some cases, two traffic lights are successively installed at a relatively short interval on a road. At some timing, one of the traffic lights that is closer to an own vehicle (hereinafter also referred to as a "closer traffic light") than the other traffic light (hereinafter also referred to as a "farther traffic light") is indicates a green signal that permits vehicles to advance straight ahead whereas the farther traffic light that is farther from the own vehicle than the closer traffic light is indicates a red signal that commands vehicles to stop.

When recognizing that the closer traffic light indicates a green signal that permits vehicles to advance straight ahead, a typical system including the system disclosed in JP-A No. 2008-308025 determines to permit the own vehicle to pass through an intersection and thus permits the own vehicle to enter the intersection following a preceding vehicle, even though the farther traffic light indicates a red signal.

However, in a situation where the farther traffic light is indicating a red signal and where a queue of stopping vehicles extends from a farther stop line positioned on a road surface on which the farther traffic light is installed, a space available for stopping the own vehicle therein may not be secured between the intersection in front of the own vehicle and the tail end of the queue, in some cases depending on the length of the queue. If the own vehicle enters the intersection in such a situation, the own vehicle can be stopped in the intersection with part of the own vehicle protruding into the intersection.

The own vehicle stopped in the intersection in front of the own vehicle can hinder an oncoming vehicle from turning right at the intersection (in a case of driving on the left side of the road). In addition, when a traffic light on a lane crossing the lane on which the own vehicle is traveling is switched to a green signal that permits vehicles to advance straight ahead, the own vehicle stopped in the intersection can hinder a vehicle traveling on the crossing lane from advancing straight ahead.

Accordingly, it is desirable to provide an automated driving assist system that allows for a smoother traveling of an own vehicle at an intersection.

The following example embodiments aim to improve convenience as follows even in a situation where the own vehicle is trying to enter the intersection even though the farther traffic light prohibits vehicles from advancing and a space available for stopping the own vehicle therein is not secured at the tail end of a queue of stopping vehicles extending from the farther stop line. In other words, in the following example embodiments, the own vehicle is prevented from stopping in an intersection with part of the own vehicle protruding into the intersection so as not to hinder right turning of an oncoming vehicle (in a case of driving on the left side of the road) and so as not to hinder straight advancing of a vehicle traveling on a lane crossing the lane on which the own vehicle is traveling from advancing straight ahead. This achieves an automated driving assist system that improves the convenience.

An automated driving assist system 1 illustrated in FIG. 1 may be mounted on an own vehicle M illustrated in FIG. 4, for example. The automated driving assist system 1 may include a locator unit 11, a camera unit 21, and a vehicle controller 22. The locator unit 11 may detect a position of the own vehicle M. The camera unit 21 serves as a front-traveling-environment acquirer that acquires traveling environment information on an environment in front of the own vehicle M. In one embodiment, the camera unit 21 or the front-traveling-environment acquirer may serve as a "first acquirer". The vehicle controller 22 controls the own vehicle M.

The locator unit 11 may estimate a position of the own vehicle M (hereinafter also referred to as "own-vehicle position") on a road map and acquire road map data on a region around the own-vehicle position. The camera unit 21 may acquire the traveling environment information on the environment in front of the own vehicle M and recognize a lane line dividing the lane on which the own vehicle M is traveling into right and left lanes, a road feature, the presence of a preceding vehicle, and the presence of a traffic light, for example. The camera unit 21 may also determine a road curvature of a middle of the lane at which the lane line is extending, an intervehicle distance between the own vehicle M and a preceding vehicle, and a relative speed between the own vehicle M and the preceding vehicle, for example.

The locator unit 11 may include a map location calculator 12 and a road map database 16 that serves as a storage storing high-definition map data. The map location calculator 12, a front-traveling-environment recognizer 21d described below, and the vehicle controller 22 may each include a known microcomputer that includes a central processing unit (CPU), a random access memory (RAM), and a read only memory (ROM), for example, and a peripheral device. The ROM may preliminarily store a program to be executed by the CPU and a base map or other fixed data, for example.

The map location calculator 12 may have an input terminal coupled to a global navigation satellite system (GNSS) receiver 13, an autonomous traveling sensor 14, and a destination information input device 15. The GNSS receiver 13 may receive positioning signals from a plurality of positioning satellites. The autonomous traveling sensor 14 may help achieve autonomous traveling of the own vehicle M in an environment, such as a region in a tunnel, where the own vehicle M has difficulty in receiving effective positional signals from the GNSS satellites due to decreased sensitivity of the GNSS receiver 13. The autonomous traveling sensor 14 may include a vehicle speed sensor, a gyroscope sensor, and a forward/backward acceleration sensor, for example. The map location calculator 12 may determine a shift distance and an azimuth of the own vehicle M on the basis of the vehicle speed of the own vehicle M detected by the vehicle speed sensor, an angular speed detected by the gyroscope sensor, and the forward or backward acceleration rate detected by the forward/backward acceleration sensor. On the basis of the shift distance and the azimuth, the map location calculator 12 may perform localization of the position of the own vehicle M.

When an operator or a driver of the own vehicle M inputs information on a destination, such as an address or a telephone number of the destination, or selects the destination from a registered list appearing on a monitor display, the destination information input device 15 may acquire a positional coordinate (i.e., a latitude and a longitude) corresponding to the destination, and set the positional coordinate as the destination.

The map location calculator 12 may include an own-vehicle position estimator 12a, a road-map information acquirer 12b, and a target-traveling-course setter 12c. The own-vehicle position estimator 12a may acquire positional information of the own vehicle M that indicates the positional coordinate (i.e., a latitude and a longitude) of the own vehicle M, on the basis of positional signals received at the GNSS receiver 13. While the own vehicle M is traveling on an environment where the own vehicle M has difficulty in receiving effective positional signals from the GNSS satellites due to decreased sensitivity of the GNSS receiver 13, the own-vehicle position estimator 12a may estimate the positional coordinate of the own vehicle M on the basis of signals from the autonomous traveling sensor 14. In one embodiment, the own-vehicle position estimator 12a may serve as an "estimator". The target-traveling-course setter 12c may set a target traveling course on which the own vehicle M is to travel. In one embodiment, the target-traveling-course setter 12c may serve as a "setter".

The road-map information acquirer 12b may perform map matching of the positional coordinate of the own vehicle M and the positional coordinate (i.e., the latitude and the longitude) of the destination set by the destination information input device 15 on the road map stored in the road map database 16. The road-map information acquirer 12b may thereby identify the position of the own vehicle M and the position of the destination, and transmit, to the target-traveling-course setter 12c, road map information on the road map from the current position of the own vehicle M to a region around the destination.

The road map database 16 may be stored in a mass storage medium, such as a hard disk drive (HDD), and include high-definition road map data or a dynamic map. The high-definition road map data may include lane data, such as data on the width of the lane line, data on a coordinate of a middle of the lane, data on an azimuthal angle of the lane in the traveling direction, data on a speed limit, and any other pieces of data necessary for execution of automated driving. The lane data may be allocated to respective lanes on the road map. For example, the lane data may be allocated to respective regions of each lane on the road map, and the respective regions may extend along the lane at several meter intervals.

The target-traveling-course setter 12c may first create, on the road map, a traveling route connecting the current position of the own vehicle M and the position of the destination that are identified through the map matching by the road-map information acquirer 12b. Thereafter, the target-traveling-course setter 12c may sequentially determine, on the traveling route, a target traveling course along which the own vehicle M is to automatically travel, and update the target traveling course. For example, the target traveling course may be set as a traveling course extending straight ahead, a traveling course turning right or left at an intersection, a traveling course set on a left lane, a middle lane, or a right lane of a straight road, or a traveling course defining a lateral position of the own vehicle M on the lane. The target traveling course may extend several hundred meters or several kilometers ahead of the own vehicle M. Note that the information on the target traveling course may be read by the vehicle controller 22.

The camera unit 21 may be fixed on an upper central portion of a front interior side of the own vehicle M. The camera unit 21 may include a vehicle-mounted camera, an image processor (IPU) 21c, and a front-traveling-environment recognizer 21d. The vehicle-mounted camera may be a stereo camera that includes a main camera 21a and a subsidiary camera 21b disposed at respective positions bilaterally symmetric to each other about a line extending through a middle of the width of the own vehicle M. The camera unit 21 may cause the main camera 21a and the subsidiary camera 21b to capture an image of a predetermined region If (illustrated in FIGS. 4 to 8) in front of the own vehicle M (i.e., acquire traveling-environment image data), and cause the IPU 21c to perform a predetermined image process on the traveling-environment image data.

The front-traveling-environment recognizer 21d may read the traveling-environment image data subjected to the image processing at the IPU 21c to acquire front-traveling-environment information on the basis of the traveling-environment image data. The front-traveling-environment information acquired by the front-traveling-environment recognizer 21d may include data on a road feature of the traveling course of the own vehicle M (hereinafter also referred to as an "own-vehicle traveling course"), data on an intersection, data on a color of a signal indicated by a traffic light, data on road signs, data on a pedestrian or a bicycle crossing the lane, for example. Specific but non-limiting examples of the data on the road feature of the own-vehicle traveling course may include a road curvature [1/m] of a middle of a lane at which a lane line dividing the lane into right and left lanes extends, and the widths of the right and left lanes divided by the lane line (i.e., lane widths).

The vehicle controller 22 may include an intersection-entry-permission determiner 22a and a vehicle control calculator 22b. The intersection-entry-permission determiner 22a determines whether to permit an entry of the own vehicle M into an intersection. In one embodiment, the intersection-entry-permission determiner 22a may serve as an "entry permission determiner". The vehicle controller 22 may have an input terminal coupled to the target-traveling-course setter 12c of the map location calculator 12, the front-traveling-environment recognizer 21d of the camera unit 21, and a traveling information detector 26, for example. The traveling information detector 26 may include various sensors that detect information on traveling of the own vehicle M, such as a vehicle speed of the own vehicle M (hereinafter also referred to as "own vehicle speed"), acceleration and deceleration rates, a time required to reach a stop line, an intervehicle distance between a preceding vehicle and the own vehicle M, a relative speed between the preceding vehicle and the own vehicle M, and any other pieces of information necessary for execution of the automated driving of the own vehicle M. In one embodiment, the traveling information detector 26 may serve as a "second detector".

Additionally, the vehicle controller 22 may have an output terminal coupled to a steering controller 31, a brake controller 32, an acceleration/deceleration controller 33, and an alarm 34. The steering controller 31 may cause the own vehicle M to travel along the target traveling course. The brake controller 32 may decelerate or stop the own vehicle M by forcible braking. The acceleration/deceleration controller 33 may control a vehicle speed of the own vehicle M.

The vehicle control calculator 22b may perform a predetermined control of the steering controller 31, the brake controller 32, and the acceleration/deceleration controller 33 to cause the own vehicle M to automatically travel along the target traveling course on the road map on the basis of the positioning signals received at the GNSS receiver 13. As described above, the target traveling course may be determined by the target-traveling-course setter 12c. During the automated driving, the vehicle control calculator 22b may perform a known adaptive cruise control (ACC) and a known active lane keep (ALK) control on the basis of the front traveling environment recognized by the front-traveling-environment recognizer 21d. When detecting a preceding vehicle, the vehicle control calculator 22b may cause the own vehicle M to travel following the preceding vehicle. When detecting no preceding vehicle, the vehicle control calculator 22b may cause the own vehicle to travel along the traveling lane at a speed within the limit.

On the basis of the road map information on the road map around the target traveling course and the front traveling environment recognized by front-traveling-environment recognizer 21d, the intersection-entry-permission determiner 22a may constantly detect whether traffic lights are successively installed on the target traveling course in front of the own vehicle M and whether one of the traffic light closer to the own vehicle M is installed at an intersection.

Figure 4A:
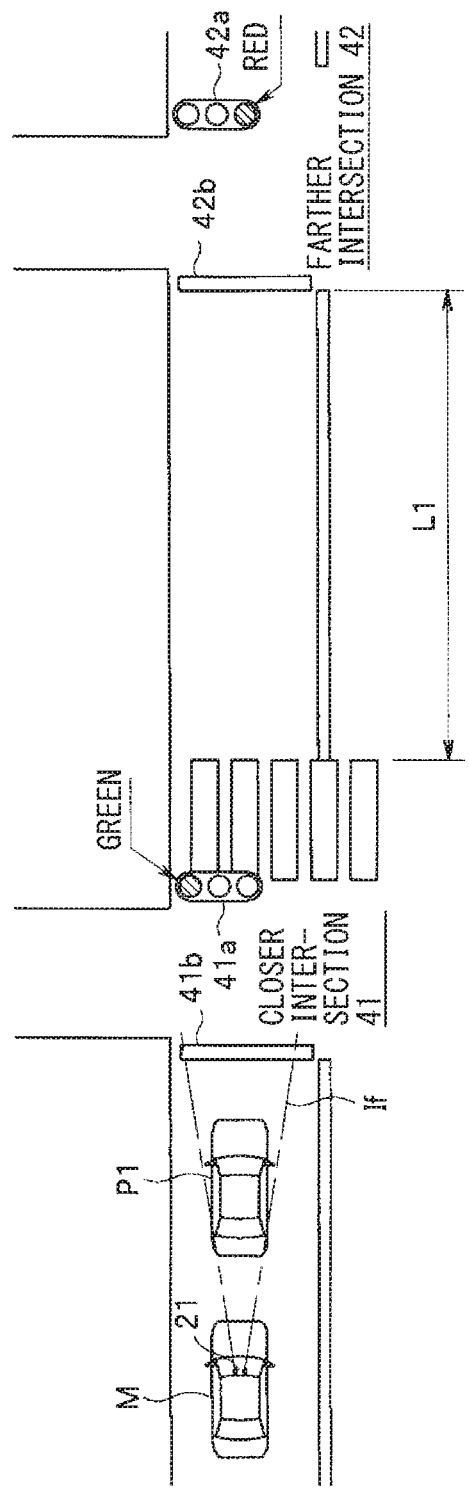
FIG. 4A is a diagram illustrating an example road on which a closer traffic light at a closer intersection and a farther traffic light at a farther intersection are successively installed.

FIG. 4A illustrates an example road on which a closer intersection 41 and a farther intersection 42 are positioned in front of the own vehicle M. The closer intersection 41 is closer to the own vehicle M than the farther intersection 42 is, and the farther intersection 42 is farther from the own vehicle than the closer intersection 41 is. In an example condition illustrated in FIG. 4 where a distance between the closer intersection 41 and the farther intersection 42 is relatively short, an available stop distance L1 available for stopping vehicles therein is short. The available stop distance L1 may extend from an end (right end in FIG. 4A) of the closer intersection 41 to a stop line (hereinafter referred to as a "farther stop line") 42b positioned on the road surface on which the farther intersection 42 is installed. In a case where a crosswalk is positioned at the closer intersection 41 in this example condition as illustrated in FIG. 4A, the available stop distance L1 is further shortened. Accordingly, while a farther traffic light 42a installed at the farther intersection 42 is indicating a red signal that prohibits vehicles from advancing, a limited number of vehicles may be allowed to stop in the available stop distance L1.

Figure 4B:
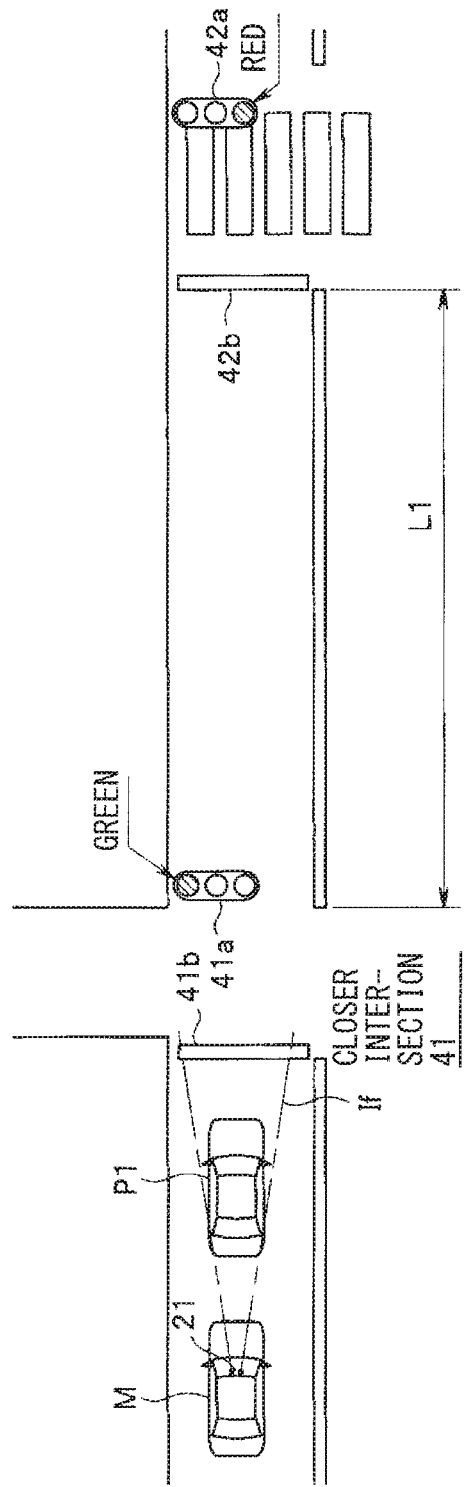
FIG. 4B is a diagram illustrating an example road on which the closer traffic light at the closer intersection and the farther traffic light are successively installed.
Figure 5:
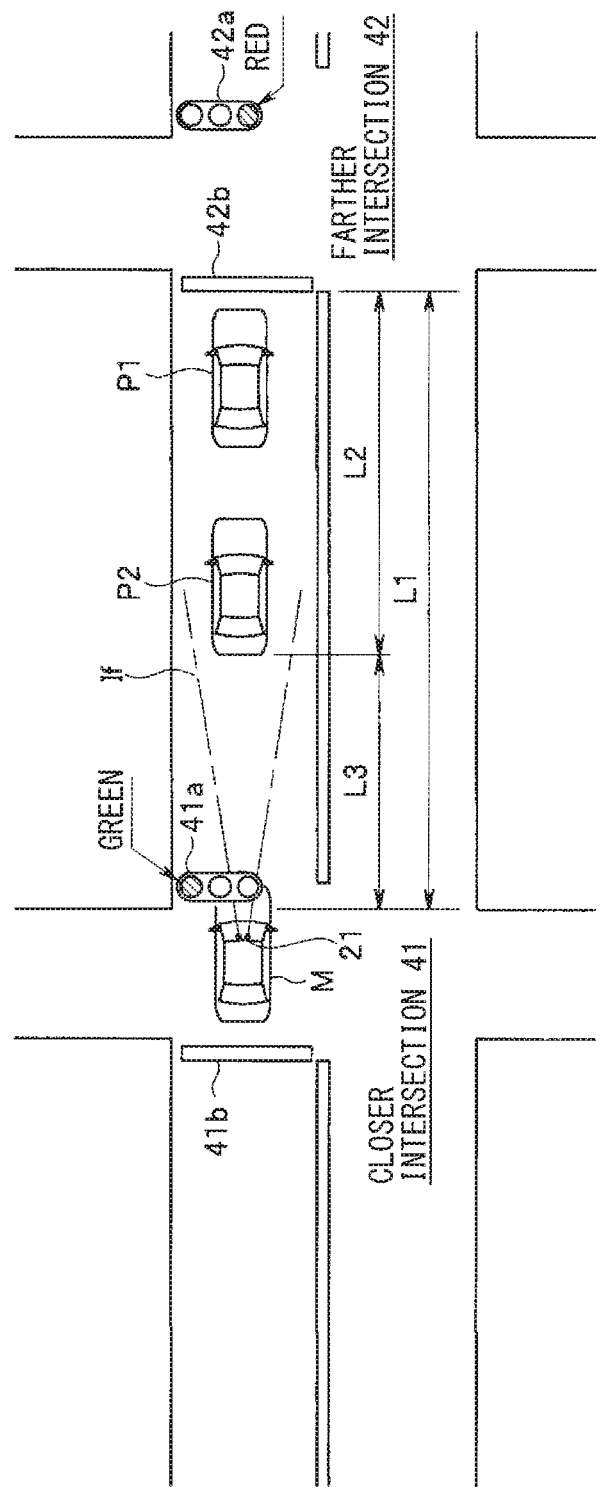
FIG. 5 is a diagram illustrating an example situation where a stop space for the own vehicle is secured at the tail end of a queue of stopping vehicles extending from a farther stop line.

Note that the farther traffic light 42a is not necessarily installed at the intersection. For example, as illustrated in FIG. 4B, the farther traffic light 42a may be a push-button traffic light or any other traffic light just for a pedestrian to go across the road. Alternatively, the farther traffic light 42a may be a traffic light for a railway crossing.

In a situation where a closer traffic light 41a installed at the closer intersection 41 indicates a green signal or an arrow signal that permits vehicles to advance and where the farther traffic light 42a indicates a red signal that prohibits vehicles from advancing, the intersection-entry-permission determiner 22a determines whether a sufficient space available for stopping the own vehicle M therein is secured at the tail end of a queue of stopping vehicles extending from the farther stop line 42b. When determining that the sufficient stop space is secured, the intersection-entry-permission determiner 22a may determine to permit the entry of the own vehicle M into the closer intersection 41. In contrast, when the intersection-entry-permission determiner 22a determines that the sufficient stop space is not secured, the vehicle control calculator 22b may cause the own vehicle M to stop at a closer stop line 41b at the closer intersection 41.

Figure 2:
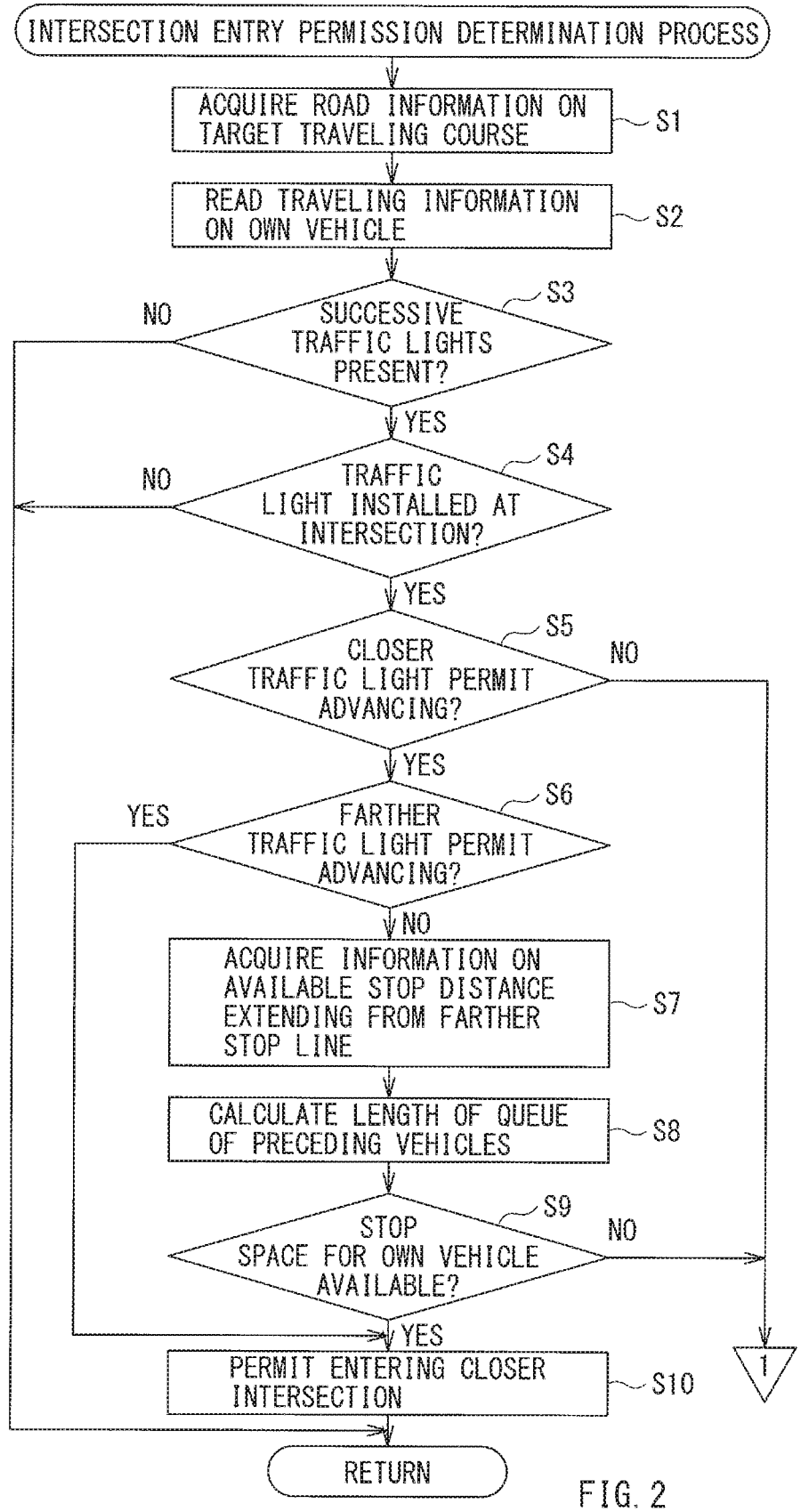
FIG. 2 is a flowchart illustrating an example routine for determining whether to permit an entry of an own vehicle into an intersection.
Figure 3:
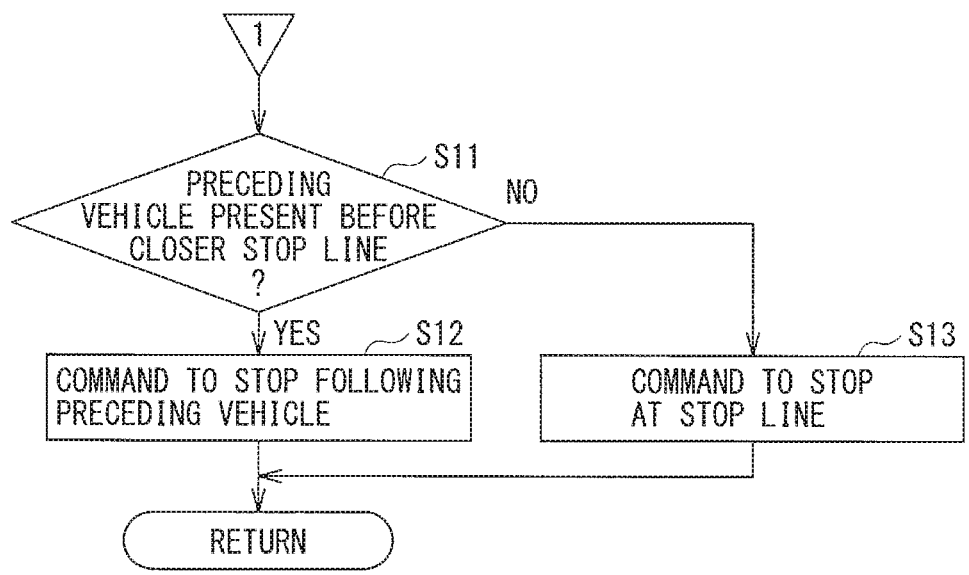
FIG. 3 is a flowchart illustrating an example routine following the routine of FIG. 2, for determining whether to permit the entry of the own vehicle into the intersection.

The intersection-entry-permission determiner 22a may determine whether to permit the entry of the own vehicle M into the intersection following an example routine illustrated in FIGS. 2 and 3, for example.

The routine may be executed every predetermined calculation cycle. First, in Step S1, the intersection-entry-permission determiner 22a may acquire road information on the target traveling course on the basis of the road map information acquired by the road-map information acquirer 12b and the front-traveling-environment information acquired by the camera unit 21. The road information on the target traveling course may include a distance from the own vehicle M to the closer intersection, a distance from the closer traffic light installed at the closer intersection to the farther traffic light, colors of signals indicated by the traffic lights, and data on a preceding vehicle traveling on the target traveling course, for example. Additionally, when the camera unit 21 recognizes the closer traffic light 41a and the farther traffic light 42a, the intersection-entry-permission determiner 22a may identify colors (red, yellow, or green) of signals or directions of arrow signals indicated by the closer traffic light 41a and the farther traffic light 42a.

Thereafter, in Step S2, the intersection-entry-permission determiner 22a may read the traveling information on the own vehicle M detected by the traveling information detector 26. As described above, the traveling information on the own vehicle M may include a vehicle speed, acceleration and deceleration rates, a time required to reach a stop line, an intervehicle distance between the preceding vehicle and the own vehicle M, and a relative speed between the preceding vehicle and the own vehicle M, for example.

Thereafter, in Step S3, the intersection-entry-permission determiner 22a may determine whether two traffic lights (i.e., the closer traffic light 41a and the farther traffic light 42a) that are successively installed on the target traveling course in front of the own vehicle M are present on the basis of the road information acquired in Step S1. The wording "installed on the target traveling course in front of the own vehicle M" may refer to a condition where the closer traffic light 41a is installed at a position apart forward from the own vehicle M by a predetermined distance (e.g., 100 meters) or shorter. To determine whether the two traffic lights are successively installed, the intersection-entry-permission determiner 22a may compare a distance between the two traffic lights with a preset threshold distance, for example. The threshold distance for the determination may be in a range from 50 meters to 100 meters, for example. In a case where the distance between the two traffic lights is equal to or shorter than the threshold distance, the intersection-entry-permission determiner 22a may determine that the two traffic lights are successively installed. In a case where the intersection-entry-permission determiner 22a detects the two traffic lights (i.e., the closer traffic light 41a and the farther traffic light 42a) that are successively installed ("YES" in Step S3), the procedure may proceed to Step S4. In contrast, in a case where the intersection-entry-permission determiner 22a detects no traffic lights that are successively installed ("NO" in Step S3), the procedure may exit the routine.

In Step S4, the intersection-entry-permission determiner 22a may determine whether the closer traffic light 41a is installed at the closer intersection 41. The intersection may be identified on the basis of any one of the road map information and the front-traveling-environment information acquired by the camera unit 21. In a case where the intersection-entry-permission determiner 22a determines that the closer traffic light 41a is installed at the closer intersection 41 ("YES" in Step S4), the procedure may proceed to Step S5. In contrast, in a case where the intersection-entry-permission determiner 22a determines that the closer traffic light 41a is installed at a region other than the intersection ("NO" in Step S4), the procedure may exit the routine. Note that the processes in Steps S3 and S4 may be performed by a signal installation condition detector. In one embodiment, the signal installation condition detector may serve as a "finding section".

In Step S5, the intersection-entry-permission determiner 22a may detect, on the basis of the traveling-environment image data acquired by the camera unit 21, a color of a signal or a direction of an arrow signal indicated by the closer traffic light 41a. In a case where the closer traffic light 41a indicates a signal in green (i.e., green signal) or in a case where the closer traffic light 41a indicates a signal in red (i.e., red signal) and an arrow signal pointing in a direction identical to the direction in which the target traveling course of the own vehicle M extends, the intersection-entry-permission determiner 22a may determine to permit the own vehicle M to advance ("YES" in Step S5), and the procedure may proceed to Step S6. In contrast, in a case where the closer traffic light 41a indicates a signal in red (i.e., red signal) and does not indicate an arrow signal pointing in a direction identical to the direction in which the target traveling course of the own vehicle M extends, the intersection-entry-permission determiner 22a may determine to prohibit the own vehicle M from advancing ("NO" in Step S5), and the procedure may jump to Step S11.

In Step S6, the intersection-entry-permission determiner 22a may detect, on the basis of the traveling-environment image data acquired by the camera unit 21, a color of a signal or a direction of an arrow signal indicated by the farther traffic light 42a. In a case where the farther traffic light 42a indicates a signal in red (i.e., red signal) and an arrow signal pointing in a direction different from the direction in which the target traveling course of the own vehicle M extends, the intersection-entry-permission determiner 22a determines to prohibit the own vehicle M from advancing ("NO" in Step S6), and the procedure may proceed to Step S7.

In contrast, in a case where the farther traffic light 42a indicates a signal in green (i.e., green signal) or in a case where the farther traffic light 42a indicates a signal in red (i.e., red signal) and an arrow signal pointing in a direction identical to the direction in which the target traveling course of the own vehicle M extends, the intersection-entry-permission determiner 22a may permit the own vehicle M to advance ("YES" in Step S6), and the procedure may jump to Step S10. Note that the processes in Steps S5 and S6 may be performed by a signal light status detector. In one embodiment, the signal light status detector may serve as a "first detector". In Step S7, information on the available stop distance L1 extending from the farther stop line 42b positioned on the road surface on which the farther traffic light 42*a* is installed may be acquired on the basis of any one of the road map information and the front-traveling-environment information acquired by the camera unit 21. As described above, the available stop distance L1 may be a distance available for stopping the own vehicle M therein and extend from the farther stop line 42*b* to an exit end of the closer intersection 41. Accordingly, in a case where a crosswalk is positioned at the closer intersection 41 as illustrated in FIG. 4A, a distance from a side (right side in FIG. 4A) of the crosswalk to the farther stop line 42*b* may correspond to the available stop distance L1. Note that the process in Step S7 may be performed by an available stop distance acquirer. In one embodiment, the available stop distance acquirer may serve as a "second acquirer".

Thereafter, in Step S8, the intersection-entry-permission determiner 22*a* may calculate a length L2 of a queue of preceding vehicles stopping in the available stop distance L1 (hereinafter referred to as "stopping vehicle queue length L2"). To calculate the stopping vehicle queue length L2, the intersection-entry-permission determiner 22*a* may first recognize, when the signal color indicated by the farther traffic light 42*a* is switched to red (i.e., red signal), preceding vehicles present between the farther stop line 42*b* and the own vehicle M (e.g., P1 and P2 in FIG. 5 and P1 to P3 in FIG. 7) on the basis of the traveling-environment image data acquired by the camera unit 21. Thereafter, the intersection-entry-permission determiner 22*a* may calculate a longitudinal length of each of the preceding vehicles.

The longitudinal length of each of the preceding vehicles may be calculated as follows. First, the intersection-entry-permission determiner 22*a* may recognize, on the basis of image information acquired before the own vehicle M enters the closer intersection 41, preceding vehicles traveling ahead of the own vehicle M. In an example case where an image of a side surface of each of the preceding vehicles is captured while the own vehicle M is traveling on a curve road, for example, the intersection-entry-permission determiner 22*a* may derive the longitudinal length of the preceding vehicle directly from the image of the side surface of the preceding vehicle. Alternatively, the intersection-entry-permission determiner 22*a* may estimate the longitudinal length from a projection image of a rear portion of each of the preceding vehicles or a width of the preceding vehicle calculated from the projection image.

Thereafter, the intersection-entry-permission determiner 22*a* may add a stop intervehicle distance to the longitudinal length of each of the preceding vehicles to determine the stopping vehicle queue length L2. Note that the stop intervehicle distance may refer to a distance to be kept between any two adjacent preceding vehicles stopping in the queue. The stop intervehicle distance may be in a range from 2 meters to 4 meters, for example. The stop intervehicle distance may be added predetermined times depending on the number of the preceding vehicles.

In other words, the stopping vehicle queue length L2 may be represented by the following expression.

L2=(longitudinal length of each preceding vehicle+
stop intervehicle distance)·(number of preceding
vehicles−1).

Thereafter, in Step S9, the intersection-entry-permission determiner 22*a* may determine whether a necessary stop space LM available for stopping the own vehicle M therein is secured in the available stop distance L1. Whether the necessary stop space LM is secured may be determined by subtracting the stopping vehicle queue length L2 from the available stop distance L1 to determine an actual stop space L3 (i.e., L3=L1−L2), and comparing the actual stop space L3 with the necessary stop space LM for the own vehicle M.

The necessary stop space LM may be a fixed value calculated by adding a predetermined stop intervehicle distance (e.g., two meters to four meters) to the longitudinal length of the own vehicle M. The necessary stop space LM may be stored in a ROM, for example.

Figure 7:
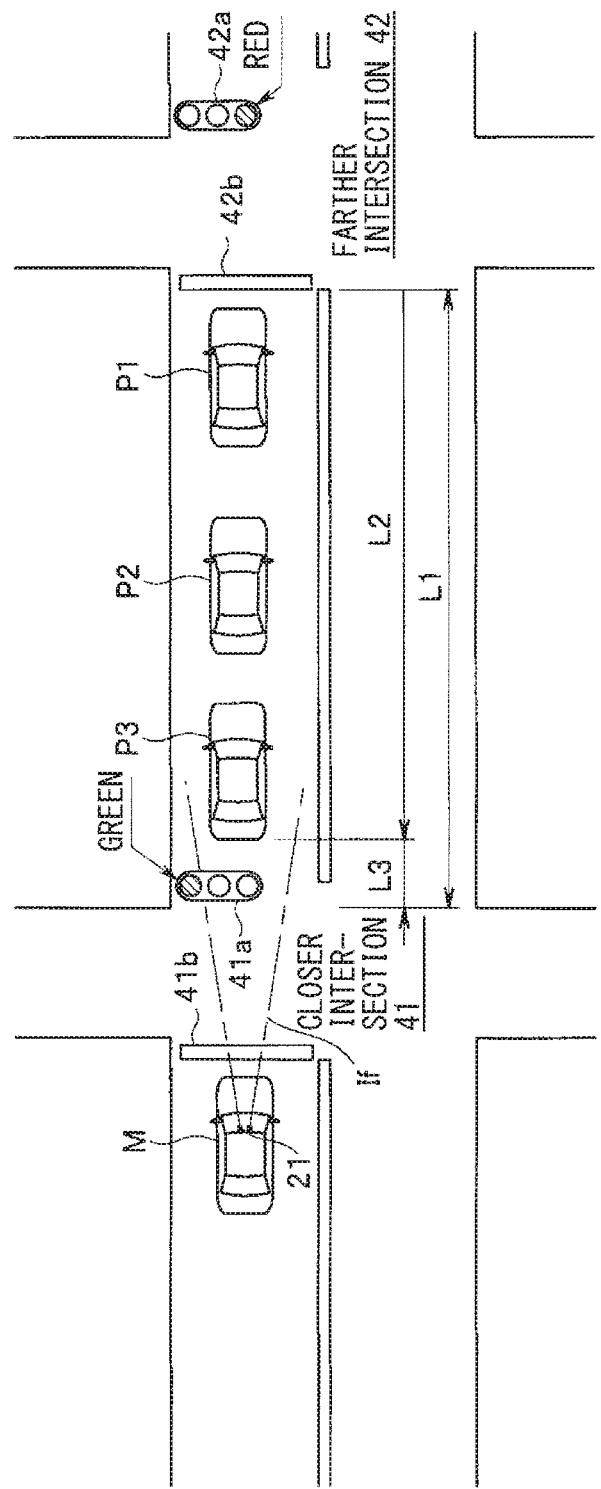
FIG. 7 is a diagram illustrating an example situation where the stop space for the own vehicle is not secured at the tail end of the queue of stopping vehicles extending from the farther stop line.

In a case where the actual stop space L3 is not smaller than the necessary stop space LM (i.e., L3≥LM), the intersection-entry-permission determiner 22*a* may determine to allow the own vehicle M to stop at the tail end of the queue of the preceding vehicle in the available stop distance L1 ("YES" in Step S9), and the procedure may proceed to Step S10. In contrast, in a case where the actual stop space L3 is smaller than the necessary stop space LM (i.e., L3<LM), the intersection-entry-permission determiner 22*a* may determine not to allow the own vehicle M to stop at the tail end of the queue of the preceding vehicle in the available stop distance L1 as illustrated in FIG. 7, and thus determine to prohibit the entry of the own vehicle M into the closer intersection 41 ("NO" in Step S9). In this case, the procedure may jump to Step S11.

Figure 6:
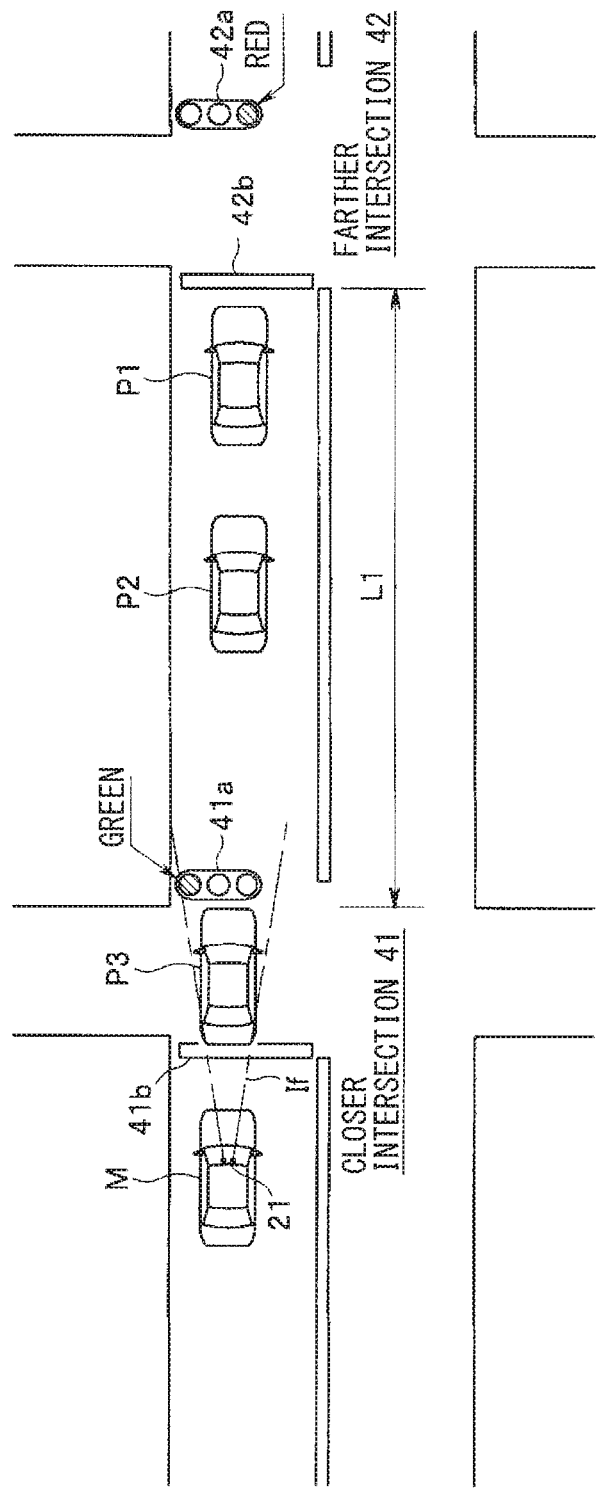
FIG. 6 is a diagram illustrating an example situation where the own vehicle is trying to enter an intersection following a preceding vehicle when the farther traffic light at the farther intersection indicates a red signal.

In a case where the preceding vehicle P3 entering the closer intersection 41 is detected as illustrated in FIG. 6, the stopping vehicle queue length L2 may be calculated by adding the longitudinal length of the preceding vehicle P3 and the intervehicle distance between the own vehicle M and the preceding vehicle P3 to the stopping vehicle queue lengths L2 of a queue that includes the preceding vehicles P1 and P2 and extends from the farther stop line 42*b*. In this case, the stopping vehicle queue length L2 may be determined on the basis of the preceding vehicles present between the farther stop line 42*b* and the own vehicle M when the farther traffic light 42*a* is switched to a red signal. Thus, the stopping vehicle queue length L2 may be calculated before the leading preceding vehicle P1 stops at the farther stop line 42*b*.

Accordingly, in a condition where the own vehicle M is traveling backward from the closer stop line 41*b* and where the intersection-entry-permission determiner 22*a* detects that a signal indicated by the farther traffic light 42*a* is switched to a red signal, the intersection-entry-permission determiner 22*a* may immediately determine whether the necessary stop space LM for the own vehicle M is secured in the available stop distance L1.

Thereafter, in Step S10, the intersection-entry-permission determiner 22*a* may permit the entry of the own vehicle M into the closer intersection 41, and the procedure may exit the routine.

When the intersection-entry-permission determiner 22*a* permits the entry of the own vehicle M into the closer intersection 41, the vehicle control calculator 22*b* may transmit a control signal to the steering controller 31 to execute the active lane keep (ALK) control that causes the own vehicle M to travel along the target traveling course. The vehicle control calculator 22*b* may also cause the brake controller 32 and the acceleration/deceleration controller 33 to perform a predetermined operation to execute the adaptive cruise control (ACC) control. In the example situations illustrated in FIGS. 4A and 4B, the vehicle control calculator 22*b* may cause the own vehicle M to travel following the preceding vehicle P1. In the example situation illustrated in FIG. 5, the vehicle control calculator 22*b* may cause the own vehicle to enter the closer intersection 41 alone.

In another situation where no preceding vehicle is present between the farther stop line 42*b* and the own vehicle M, the vehicle control calculator 22b may execute a stop-line stopping process described below to cause the own vehicle M to stop at the farther stop line 42b. The stop-line stopping process may be applied in which the closer stop line 41b may be read as the farther stop line 42b.

Thereafter, in Step S11, the intersection-entry-permission determiner 22a may determine, on the basis of the front-traveling-environment information of the own vehicle M acquired by the camera unit 21, whether a preceding vehicle traveling backward from the closer stop line 41b is present immediately ahead of the own vehicle M. In a case where the intersection-entry-permission determiner 22a determines that the preceding vehicle traveling backward from the closer stop line 41b is present ("YES" in Step S11), the procedure may proceed to Step S12. In Step S12, the intersection-entry-permission determiner 22a may transmit, to the vehicle control calculator 22b, a command to cause the own vehicle M to stop following the preceding vehicle, and the procedure may exit the routine. In response to the command, the vehicle control calculator 22b may execute the ACC control that causes the own vehicle M to travel following the preceding vehicle, and execute a follow-up stop process that causes the own vehicle M to stop at a position apart from the preceding vehicle by a predetermined intervehicle distance.

In contrast, in a case where the intersection-entry-permission determiner 22a determines that no preceding vehicle is present between the own vehicle M and the closer stop line 41b ("NO" in Step S11), the procedure may proceed to Step S13. In Step S13, the intersection-entry-permission determiner 22a may transmit, to the vehicle control calculator 22b, a command to cause the own vehicle to stop at the stop line, and the procedure may exit the routine. Note that the processes in Steps S8 to S13 may be performed by an intersection entry permission determiner. In one embodiment, the intersection entry permission determiner may serve as a "determiner".

The vehicle control calculator 22b may execute the stop-line stopping process as follows. The vehicle control calculator 22b may determine a distance from the own vehicle M to the closer stop line 41b on the basis of the front-traveling-environment information acquired by the camera unit 21, for example. Thereafter, the vehicle control calculator 22b may execute the stop-line stopping process on the basis of the distance from the own vehicle M to the closer stop line 41b and a current vehicle speed of the own vehicle M. In other words, the vehicle control calculator 22b may determine a target own vehicle speed that allows the own vehicle M to stop at the closer stop line 41b, and may operate the brake controller 32 and the acceleration/deceleration controller 33 to cause the own vehicle M to travel at the target vehicle speed.

Figure 8:
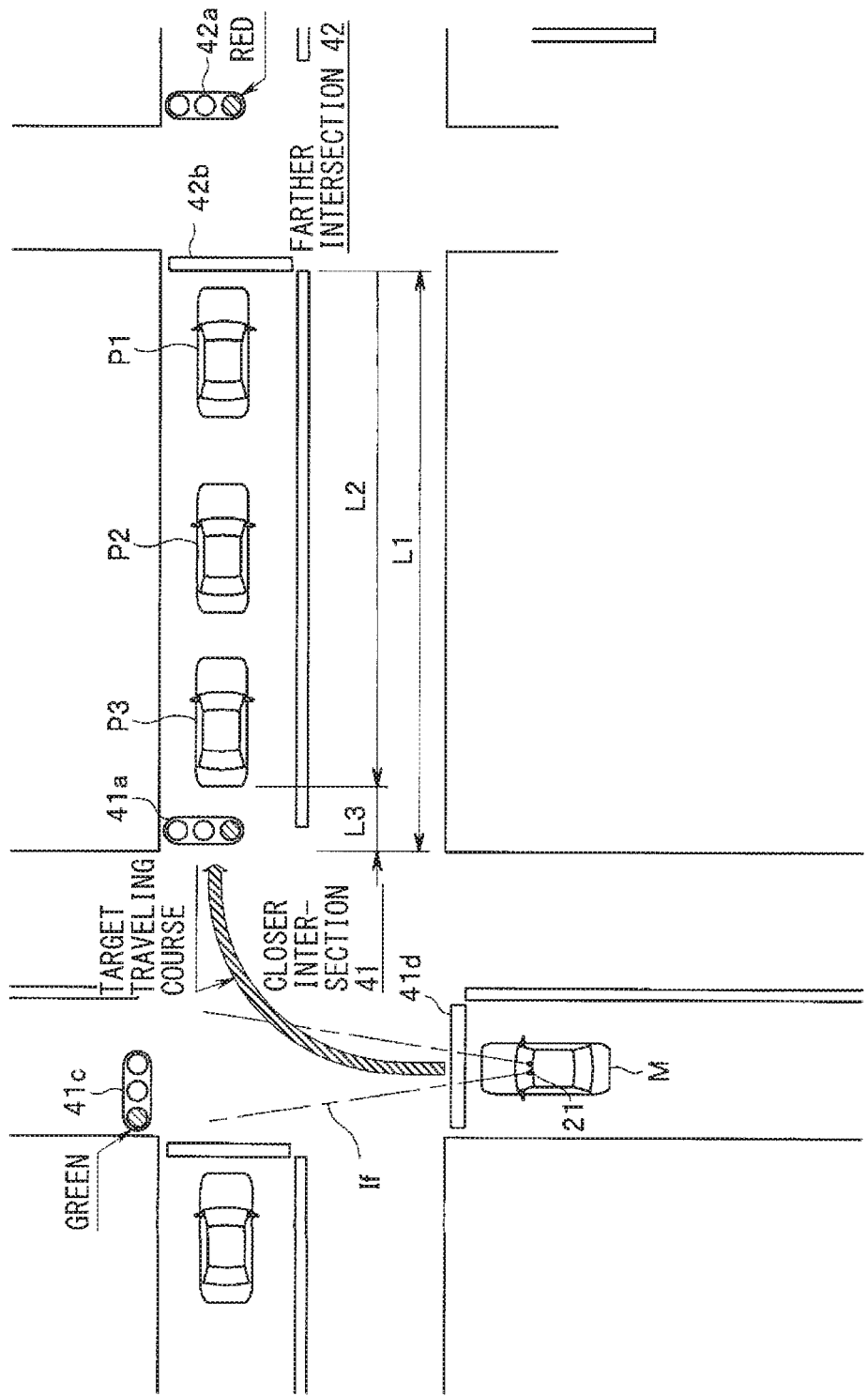
FIG. 8 is a diagram illustrating an example situation where the stop space for the own vehicle is not secured at the tail end of a queue of stopping vehicles extending from the farther stop line when the own vehicle is trying to turn right at the closer intersection.

Note that the example routine for determining whether to permit the entry of the own vehicle M into the intersection is applicable not only to a case where the own vehicle M advances straight through the closer intersection 41 but also a case where the own vehicle M turns right or left at the closer intersection 41 along the target traveling course, as illustrated in FIG. 8. In a condition where the own vehicle M tries to turn right or left at the closer intersection 41 and where the necessary stop space LM for the own vehicle M is not secured in the available stop distance L1 extending from the farther stop line 42b, the own vehicle M is caused to stop at a front stop line 41d without entering the closer intersection 41 even though the closer traffic light 41c indicates a signal in green (i.e., green signal) or an arrow signal permitting the own vehicle M to turn in right or left.

Note that the routine for determining whether to permit the entry of the own vehicle M into the intersection may be repeated every predetermined calculation cycle. Accordingly, the farther intersection 42 recognized in a previous routine may correspond to the closer intersection 41 to be recognized in a current routine executed after the own vehicle M passes through the closer intersection 41 recognized in the previous routine.

According to the example embodiment described above, in a condition where the two traffic lights (i.e., the closer traffic light 41a and the farther traffic light 42a) are successively installed ahead of the own vehicle M automatically driving and the closer traffic light 41a is installed at the closer intersection 41, and where the closer traffic light 41a indicates a signal permitting the own vehicle M to advance and the farther traffic light 42a indicates a signal prohibiting the own vehicle M from advancing (i.e., red signal), the intersection-entry-permission determiner 22a may determine whether the necessary stop space LM for the own vehicle M is secured in the available stop distance L1 between the farther stop line 42b and the closer intersection 41. When the intersection-entry-permission determiner 22a determines that the necessary stop space LM for the own vehicle M is not secured in the available stop distance L1, the vehicle control calculator 22b may cause the own vehicle M to stop at the closer stop line 41b without allowing the own vehicle M to enter the closer intersection 41.

This prohibits the own vehicle M from entering the closer intersection 41 in a condition where the closer traffic light 41a indicates a signal permitting vehicles to advance (i.e., green signal) and where necessary stop space LM is not secured in the available stop distance L1. Accordingly, the own vehicle M is prevented from stopping in the closer intersection 41 with part of the own vehicle M protruding into the intersection the closer intersection 41, prevented from hindering right turning of an oncoming vehicle traveling on the left side of the road, and prevented from hindering straight advancing of a vehicle traveling on a lane crossing, at the intersection, the lane on which the own vehicle M is traveling. This achieves the automated driving assist system 1 that makes it possible to improve convenience described above. Therefore, it is possible to provide an automated driving assist system that allows for a smoother traveling of an own vehicle at an intersection.

It should be understood that the technology is not limited to the example embodiments described above. For example, the lighting statuses of the closer traffic light 41a and the farther traffic light 42a may be acquired by a road-to-vehicle communication. Additionally, the information on a vehicle traveling ahead of the own vehicle M may be acquired by an intervehicle communication.

The embodiment described above explains an example of an automated driving assist system in the case where the subject vehicle travels on a road where drivers keep to the left by law. Needless to say, if the automated driving assist system is to be applied to a road where drivers keep to the right by law, left and right settings or the like may be appropriately set in an opposite manner.

Although some embodiments of the technology are described hereinabove, the foregoing embodiments are merely examples and are not intended to limit the scope of the technology. The use of the terms first, second, etc. does not denote any order or importance, but rather the terms first, second, etc. are used to distinguish one element from another. It should be appreciated that modifications and alterations of the novel method and apparatus described herein may be made. It should be also appreciated that various omissions, replacements, and modifications may be made in the method and the apparatus described herein, without departing from the scope of the spirit of the technology. The technology is intended to include such modifications and alterations in so far as they fall within the scope of the appended claims or the equivalents thereof.

The own-vehicle position estimator 12a and the target-traveling-course setter 12c of the map location calculator 12 and the vehicle controller 22 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the own-vehicle position estimator 12a and the target-traveling-course setter 12c of the map location calculator 12 and the vehicle controller 22. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the own-vehicle position estimator 12a and the target-traveling-course setter 12c of the map location calculator 12 and the vehicle controller 22 illustrated in FIG. 1.

The invention claimed is:

1. An automated driving assist system comprising:
at least one processor programed to perform as:
a first acquirer configured to acquire traveling environment information indicating a traveling environment in front of an own vehicle;
an estimator configured to estimate a current position of the own vehicle;
a setter configured to set a target traveling course on a basis of the current position of the own vehicle estimated by the estimator and a destination determined, the target traveling course being retrieved from road map information; and
a vehicle controller configured to cause the own vehicle to travel along the target traveling course, the vehicle controller performing as an entry-permission determiner configured to determine whether to permit an entry of the own vehicle into an intersection positioned on the target traveling course in front of the own vehicle, the vehicle controller performing as:
a finding section configured to search, on a basis of either one of the road map information and the traveling environment information acquired by the first acquirer, for presence of a first traffic light and a second traffic light that are successively installed on the target traveling course in front of the own vehicle, and to find, in a case where determining that the first traffic light and the second traffic light that are successively installed are present, whether the first traffic light is installed at the intersection in front of the own vehicle, the first traffic light being closer to the own vehicle than the second traffic light is, the second traffic light being farther from the own vehicle than the first traffic light is;
a first detector configured to detect, in a case where the finding section determines that the first traffic light and the second traffic light that are successively installed are present and that the first traffic light is installed at the intersection in front of the own vehicle, respective lighting statuses of a signal indicated by the first traffic light and a signal indicated by the second traffic light, the respective lighting statuses of the signal indicated by the first traffic light and the signal indicated by the second traffic light being detected on a basis of the traveling environment information acquired by the first acquirer;
a second acquirer configured to acquire, in a case where the first detector detects that the first traffic light indicates a signal permitting vehicles to advance and that the second traffic light indicates a signal prohibiting the vehicles from advancing, an available stop distance available for stopping the own vehicle therein, the available stop distance being determined on a basis of either one of the road map information and the traveling environment information acquired by the first acquirer, the available stop distance extending from a farther stop line positioned on a road surface on which the second traffic light is installed to the intersection in front of the own vehicle; and
a determiner configured to determine, on a basis of the available stop distance acquired by the second acquirer and a traveling condition of a preceding vehicle traveling ahead of the own vehicle, whether to permit the entry of the own vehicle into the intersection in front of the own vehicle,
wherein the determiner
acquires the traveling condition of the preceding vehicle on a basis of the traveling environment information acquired by the first acquirer, the traveling condition of the preceding vehicle covering from a region in front of the own vehicle to the farther stop line,
calculates a length of a vehicle queue on a basis of the acquired traveling condition of the preceding vehicle, and
determines, in a case where a difference value between the available stop distance acquired by the second acquirer and the calculated length of the vehicle queue is greater than a space necessary for stopping the own vehicle, to permit the entry of the own vehicle into the intersection in front of the own vehicle.

2. The automated driving assist system according to claim 1, wherein the vehicle controller executes an adaptive cruise control in a case where the determiner determines to permit the entry of the own vehicle into the intersection in front of the own vehicle, the adaptive cruise control causing the own vehicle to travel following the preceding vehicle traveling immediately ahead of the own vehicle, the preceding vehicle being recognized on a basis of the traveling environment information acquired by the first acquirer.

3. An automated driving assist system comprising:
at least one processor programed to perform as:
a first acquirer configured to acquire traveling environment information indicating a traveling environment in front of an own vehicle;
an estimator configured to estimate a current position of the own vehicle;
a setter configured to set a target traveling course on a basis of the current position of the own vehicle estimated by the estimator and a destination determined, the target traveling course being retrieved from road map information; and
a vehicle controller configured to cause the own vehicle to travel along the target traveling course, the vehicle controller performing as an entry-permission determiner configured to determine whether to permit an entry of the own vehicle into an intersection positioned on the target traveling course in front of the own vehicle, the vehicle controller performing as:
a finding section configured to search, on a basis of either one of the road map information and the traveling environment information acquired by the first acquirer, for presence of a first traffic light and a second traffic light that are successively installed on the target traveling course in front of the own vehicle, and to find, in a case where determining that the first traffic light and the second traffic light that are successively installed are present, whether the first traffic light is installed at the intersection in front of the own vehicle, the first traffic light being closer to the own vehicle than the second traffic light is, the second traffic light being farther from the own vehicle than the first traffic light is;
a first detector configured to detect, in a case where the finding section determines that the first traffic light and the second traffic light that are successively installed are present and that the first traffic light is installed at the intersection in front of the own vehicle, respective lighting statuses of a signal indicated by the first traffic light and a signal indicated by the second traffic light, the respective lighting statuses of the signal indicated by the first traffic light and the signal indicated by the second traffic light being detected on a basis of the traveling environment information acquired by the first acquirer;
a second acquirer configured to acquire, in a case where the first detector detects that the first traffic light indicates a signal permitting vehicles to advance and that the second traffic light indicates a signal prohibiting the vehicles from advancing, an available stop distance available for stopping the own vehicle therein, the available stop distance being determined on a basis of either one of the road map information and the traveling environment information acquired by the first acquirer, the available stop distance extending from a farther stop line positioned on a road surface on which the second traffic light is installed to the intersection in front of the own vehicle; and
a determiner configured to determine, on a basis of the available stop distance acquired by the second acquirer and a traveling condition of a preceding vehicle traveling ahead of the own vehicle, whether to permit the entry of the own vehicle into the intersection in front of the own vehicle,
wherein the determiner
acquires the traveling condition of the preceding vehicle on a basis of the traveling environment information acquired by the first acquirer, the traveling condition of the preceding vehicle covering from a region in front of the own vehicle to the farther stop line,
calculates a length of a vehicle queue on a basis of the acquired traveling condition of the preceding vehicle, and determines, in a case where a difference value between the available stop distance acquired by the second acquirer and the calculated length of the vehicle queue is less than a space necessary for stopping the own vehicle, to prohibit the entry of the own vehicle into the intersection in front of the own vehicle.

4. The automated driving assist system according to claim 3, further comprising a second detector configured to detect a vehicle speed of the own vehicle,
the vehicle controller determining, in a case where the determiner determines to prohibit the entry of the own vehicle into the intersection in front of the own vehicle, a target vehicle speed that allows the own vehicle to stop at a stop line, the target vehicle speed being determined on a basis of a distance from the own vehicle to a stop line positioned at the intersection in front of the own vehicle and the vehicle speed detected by the second detector, the distance from the own vehicle to the stop line positioned at the intersection in front of the own vehicle being determined on a basis of the traveling environment information acquired by the first acquirer.

5. An automated driving assist system comprising:
circuitry configured to:
acquire traveling environment information indicating a traveling environment in front of an own vehicle;
detect, in a case where a first traffic light and a second traffic light that are successively installed are present and where the first traffic light is installed at an intersection in front of the own vehicle, respective lighting statuses of a signal indicated by the first traffic light and a signal indicated by the second traffic light, the respective lighting statuses of the signal indicated by the first traffic light and the signal indicated by the second traffic light being detected on a basis of the acquired traveling environment information, the first traffic light being closer to the own vehicle than the second traffic light is, the second traffic light being farther from the own vehicle than the first traffic light is;
estimate a current position of the own vehicle;
set a target traveling course on a basis of the estimated current position of the own vehicle and a destination determined, the target traveling course being retrieved from road map information;
cause the own vehicle to travel along the target traveling course;
determine whether to permit an entry of the own vehicle into the intersection in front of the own vehicle on the target traveling course;
search, on a basis of either one of the road map information and the acquired traveling environment information, for presence of the first traffic light and the second traffic light that are successively installed on the target traveling course in front of the own vehicle, and find, in a case where it is determined that the first traffic light and the second traffic light that are successively installed are present, whether the first traffic light is installed at the intersection in front of the own vehicle;
acquire, in a case where the circuitry detects that the first traffic light indicates a signal permitting vehicles to advance and that the second traffic light indicates a signal prohibiting the vehicles from advancing, an available stop distance available for stopping the own vehicle therein, the available stop distance being determined on a basis of either one of the road map information and the acquired traveling environment information, the available stop distance extending from a farther stop line positioned on a road surface on which the second traffic light is installed to the intersection in front of the own vehicle; and determine, on a basis of the acquired available stop distance and a traveling condition of a preceding vehicle traveling ahead of the own vehicle, whether to permit the entry of the own vehicle into the intersection in front of the own vehicle;

wherein the circuitry is further configured to:

acquires the traveling condition of the preceding vehicle on a basis of the traveling environment information, the traveling condition of the preceding vehicle covering from a region in front of the own vehicle to the farther stop line, calculates a length of a vehicle queue on a basis of the acquired traveling condition of the preceding vehicle, and determines, (1) in a case where a difference value between the acquired available stop distance and the calculated length of the vehicle queue is greater than a space necessary for stopping the own vehicle, to permit the entry of the own vehicle into the intersection in front of the own vehicle, or (2) in a case where a difference value between the acquired available stop distance and the calculated length of the vehicle queue is less than a space necessary for stopping the own vehicle, to prohibit the entry of the own vehicle into the intersection in front of the own vehicle.

* * * * *